United States Patent
Itou

(10) Patent No.: US 9,523,970 B2
(45) Date of Patent: Dec. 20, 2016

(54) FIELD DEVICE INFORMATION DISPLAY APPARATUS AND METHOD THAT DISPLAY INFORMATION BASED ON PROXIMITY

(71) Applicant: YOKOGAWA ELECTRIC CORPORATION, Musashino-shi, Tokyo (JP)

(72) Inventor: Toshihiro Itou, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 553 days.

(21) Appl. No.: 13/742,820

(22) Filed: Jan. 16, 2013

(65) Prior Publication Data

US 2013/0190902 A1  Jul. 25, 2013

(30) Foreign Application Priority Data

Jan. 19, 2012  (JP) .................................. 2012-009138

(51) Int. Cl.
G05B 15/02 (2006.01)
G06Q 10/06 (2012.01)

(52) U.S. Cl.
CPC .............. *G05B 15/02* (2013.01); *G06Q 10/06* (2013.01)

(58) Field of Classification Search
None
See application file for complete search history.

(56) References Cited

U.S. PATENT DOCUMENTS 6,177,905 B1 * 1/2001 Welch ...................... 342/357.75
7,317,952 B2 * 1/2008 Bhandiwad ........ G05B 19/4185
700/17
(Continued)

FOREIGN PATENT DOCUMENTS

CN  1846115 A  10/2006
CN  101552889 A  10/2009
(Continued)

OTHER PUBLICATIONS

Stackpole, 'The iPad takes on manufacturing', Computerworld, 2011 (http://www.computerworld.com/article/2510705/computer-hardware/the-ipad-takes-on-manufacturing.html).*

Primary Examiner — Mohammad Ali
Assistant Examiner — Bernard G Lindsay
(74) Attorney, Agent, or Firm — Sughrue Mion, PLLC

(57) ABSTRACT

A device information display apparatus displaying device information acquired by communicating with a field device may include a storage unit that associates and stores first position information indicating a position at which the device information displayed on the display device is acquired and reproduction information for reproducing display content of the display device that has been modified based on an operation instruction for the device information displayed on the display device; a position information acquisition unit that acquires second position information indicating a current position of the device information display apparatus; and a display control unit that calculates a distance between positions indicated by the first position information and the second position information, wherein if the distance is no greater than a prescribed reference distance, the reproduced information corresponding to the first position information is used to reproduce the display content of the display device on the display device.

16 Claims, 10 Drawing Sheets

(56) References Cited

U.S. PATENT DOCUMENTS

| | | | |
|---|---|---|---|
| 2003/0148775 A1* | 8/2003 | Spriestersbach et al. | 455/456 |
| 2004/0243307 A1 | 12/2004 | Geelen | |
| 2006/0004763 A1* | 1/2006 | Horvitz | G06F 17/30867 |
| 2007/0050259 A1* | 3/2007 | Wesley | 705/16 |
| 2007/0077665 A1 | 4/2007 | Bump et al. | |
| 2007/0109148 A1 | 5/2007 | Wada | |
| 2009/0228467 A1 | 9/2009 | Asanuma | |
| 2010/0190442 A1* | 7/2010 | Citrano et al. | 455/41.2 |
| 2010/0290359 A1* | 11/2010 | Dewey et al. | 370/252 |
| 2012/0327107 A1* | 12/2012 | Fink | G05B 19/409 |
| | | | 345/619 |

FOREIGN PATENT DOCUMENTS

| | | |
|---|---|---|
| JP | 2006-252145 A | 9/2006 |
| JP | 2010-079384 A | 4/2010 |

* cited by examiner

FIELD DEVICE INFORMATION DISPLAY APPARATUS AND METHOD THAT DISPLAY INFORMATION BASED ON PROXIMITY

BACKGROUND OF THE INVENTION

Field of the Invention

The present invention relates to a device information display apparatus and a method that display device information of a field device.

Priority is claimed on Japanese Patent Application No. 2012-009138, filed Jan. 19, 2012, the content of which is incorporated herein by reference.

Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, in order to implement a high level of automated operation in plants, factories, and the like, distributed control systems (DCSs), in which on-site equipment (measurement instruments and actuators) known as field devices are connected to device management apparatuses that manage and control the field devices, via a communication bus, have been implemented. Field devices supplied by various manufacturers are often installed in such plants, and management of a mixture of field devices with different specifications becomes difficult. Given this, EDDL (Electronic Device Description Language), which is a conventional language for describing the characteristics and attributes of field devices, is used to accommodate differences between the specifications of field devices provided by various manufactures, thereby implementing uniform management.

In this case, field devices that are installed in a plant or the like, from the standpoint of preventing abnormal operation and maintaining measurement accuracy and the like, are subjected to periodic or non-periodic maintenance by workers. The maintenance of field devices is commonly done using portable terminal device, such as a computer or PDA (personal digital assistant) in which a dedicated tool (field device setting tool) for the purpose of setting and adjusting field devices is installed. With regard to this field device setting tool as well, in order to recognize the characteristics and attributes of the field devices being maintained, the above-noted EDDL is used.

Specifically, when performing maintenance on a field device, a worker first connects the field device being maintained and a portable terminal device into which a field device setting tool is installed using a cable (for example, a USB (Universal Serial Bus) cable). Next, the worker operates the portable terminal device so as to acquire device information (parameters) from the field device and display the acquired device information. Then, referring to the device information displayed on the portable terminal device, if necessary the worker operates the portable terminal device so as to change the device information and then instructs the field device for setting the device information. In this manner, various settings and adjustments are performed on field devices.

Japanese Unexamined Patent Application, First Publication No. 2010-79384 discloses a device information display apparatus that, while conforming to the e-EDD (Enhanced Electronic Device Description) standard, enables the display of device information of field devices in a multi-window environment. Also, Japanese Unexamined Patent Application, First Publication No. 2006-252145 discloses a device information display apparatus that displays device information in accordance with a template that governs the method of display of the device information. Additionally, United States Patent Application, Publication No. 2007/0077665 discloses art that enables modification to a user interface in a tool that uses a DTM (device type manager).

The art disclosed in Japanese Unexamined Patent Application, First Publication No. 2010-79384 uses a DD (device descriptor) file prepared by the vendor of a field device for displaying the device information. Because the DD file defines not only all of the characteristics and attributes of the field device provided by the vendor but also the display menu, there is a huge amount of device information displayed. This being the case, it takes time for a user to reach the device information that is to be accessed, thereby resulting in the problem of poor operation. Also, because of the large amount of displayed device information, there is a risk of operational errors, such as accessing device information that has the same name but different characteristics or attributes.

Also, although the art disclosed in Japanese Unexamined Patent Application, First Publication No. 2006-252145 enables modification of the method of displaying the device information, it is necessary to code the template establishing the display method in text format, thereby resulting in the problem of poor usability. Although United States Patent Application, Publication No. 2007/0077665 discloses the enabling of a graphical modification to the user interface, this does not conform to the EDD standard and, because it defines the display menu structure using a proprietary format, it leads to the problem of a lack of general usability and expandability.

The device information that a worker is required to access to perform maintenance on a field device is substantially fixed for each type of device that is to be maintained and, with the exception of a case in which an abnormality occurs, there is almost no accessing of device information other than this fixed device information. For this reason, if the device information that has been accessed by a worker when performing maintenance tasks in the past is automatically displayed, the effort required by the worker to select the device information to be accessed is eliminated, and a dramatic improvement in the work efficiency can be expected.

SUMMARY

A device information display apparatus, which displays device information acquired by communicating with a field device on a display device, may include: a storage unit configured to associate and store first position information, which indicates a position at which the device information displayed on the display device is acquired, and reproduction information, which is for reproducing display content of the display device that has been modified based on an operation instruction for the device information displayed on the display device; a position information acquisition unit configured to acquire second position information that indicates a current position of the device information display apparatus; and a display control unit configured to calculate a distance between positions indicated by the first position information and the second position information, wherein if the distance is no greater than a prescribed reference distance, the reproduced information corresponding to the first position information is used to reproduce the display content of the display device on the display device.

The display control unit may be configured to reproduce the display content by using the reproduction information in units of windows.

The display control unit may be configured to store the second position information, which is acquired by the position information acquisition unit, into the storage unit corresponding to the reproduction information as the first position information if the display content of the display device is changed based on the operation instruction.

The device information display apparatus may further include: an input/output unit configured to be capable of outputting to outside the reproduction information stored in the storage unit, and receiving from the outside the reproduction information that is to be stored in the storage unit.

The display control unit may be configured to be capable of displaying a two-dimensional map showing a relationship between the position indicated by the first position information stored in the storage unit and the position indicated by the second position information acquired in the position information acquisition unit.

The position information acquisition unit may be configured to measure the position of the device information display apparatus by receiving a radio signal from a satellite using the Global Positioning System.

The storage unit may be configured to store the first position information, which indicates the position of acquisition of the device information from the field device when maintenance work of the field device is done, information indicating the field device from which, and the time at which, the device information had been acquired, the reproduction information, which is for reproducing the display content of the display device that has been modified based on a user instruction, information indicating a time of modification of the display content, and information indicating the number of times of accessing the display content of the display device.

The display control unit may be configured to edit device information display screen displayed on the display device and to manage the storage unit in response to the operation instruction output from an input device.

The display control unit may be configured to change device information display screen that is to be displayed on the display device by changing the device information that is managed by the display control unit based on the operation instruction output from an input device.

The display control unit may be configured to count the number of times that each page displayed on the display device is accessed and to store information indicating the counted number of access times in the storage unit.

The device information display apparatus may further include: a manual editing unit configured to set display or non-display for individual device information displayed on the display device based on an operation of an input device by a user.

A device information display method for displaying device information acquired by communicating with a field device on a display device may include: acquiring first position information that indicates a position at which the device information displayed on the display device is acquired; storing reproduction information, which is for reproducing display content of the display device that has been modified based on an operation instruction for the device information displayed on the display device, associating the reproduction information with the first position information; acquiring second position information that indicates a current position; and calculating a distance between positions indicated by the first position information and the second position information, wherein if the distance is no greater than a prescribed reference distance, the reproduction information corresponding to the first position information is used to reproduce the display content of the display device on the display device.

The device information display method may further include: reproducing the display content by using the reproduction information in units of windows.

The device information display method may further include: storing the second position information, which is acquired by the position information acquisition unit, corresponding to the reproduction information as the first position information if the display content of the display device is changed based on the operation instruction.

The device information display method may further include: outputting to outside the reproduction information that has been stored; and receiving from the outside the reproduction information that is to be stored.

The device information display method may further include: displaying a two-dimensional map showing a relationship between the position indicated by the first position information stored in the storage unit and the position indicated by the second position information acquired in the position information acquisition unit.

The device information display method may further include: measuring the current position by receiving a radio signal from a satellite using the Global Positioning System.

The device information display method may further include: storing the first position information, which indicates the position of acquisition of the device information from the field device when maintenance work of the field device is done, information indicating the field device from which, and the time at which, the device information had been acquired, the reproduction information, which is for reproducing the display content of the display device that has been modified based on a user instruction, information indicating a time of modification of the display content, and information indicating the number of times of accessing the display content of the display device.

The device information display method may further include: counting the number of times that each page displayed on the display device is accessed; and storing information indicating the counted number of access times in the storage unit.

The device information display method may further include: setting display or non-display for individual device information displayed on the display device based on an operation of an input device by a user.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

First Preferred Embodiment

Figure 1:
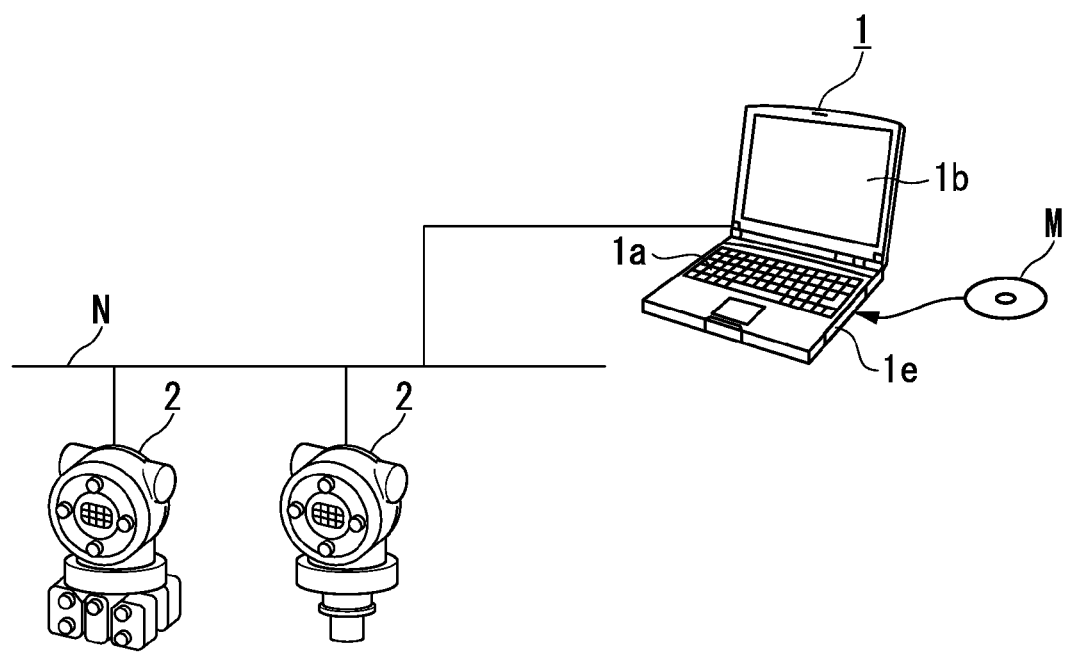
FIG. 1 is a drawing showing the outer appearance of a device information display apparatus in accordance with a first preferred embodiment of the present invention.

FIG. 1 is a drawing showing the outer appearance of the device information display apparatus in accordance with the first preferred embodiment of the present invention. As shown in FIG. 1, a device information display apparatus 1 of the first preferred embodiment is connected via a network N to field devices 2, which are installed in a plant or factory and, by communicating with field device 2 via the network N, acquires device information (parameters) of the field devices 2 and displays the acquired parameters.

The field devices 2 are devices, for example, sensing devices such as flow gauges and temperature sensors, valve devices such as flow amount control valves and open/close valves, actuators such as fans and motors, and other devices installed in a plant or factory. A plurality of these field devices 2 are installed in a plant or the like and are each connected to the network N that is provided throughout the plant or the like, and which are managed by a management device (not shown) also connected to the network N. Although only two field devices 2 are shown in FIG. 1, the number of field devices 2 is arbitrary.

The device information display apparatus 1 is implemented, for example, by a laptop personal computer or the like that includes an input device 1a such as a keyboard or a pointing device, a display device 1b such as a liquid-crystal display device, a communication device 1c, a GPS device 1d, and a drive device 1e, and the like. The GPS device 1d constitutes a position information acquisition unit. Illustration of the communication device 1c and the GPS 1d has been omitted from FIG. 1. For these elements, refer to FIG. 2.

The GPS device 1d is provided for the purpose of measuring the position of the device information display apparatus 1, receives a radio signal from a satellite using the Global Positioning System, and outputs the received signal. The drive device 1e is a device that reads out data that is recorded on a computer-readable recording medium M such as a CD-ROM or DVD (registered trademark)-ROM. The functionality of the device information display apparatus 1 (for example, function of communicating with the field devices 2 and function of displaying parameters acquired from the field devices 2) is implemented in a software manner, by reading a program recorded in the recording medium M into the drive device 1e and installing the program.

Figure 2:
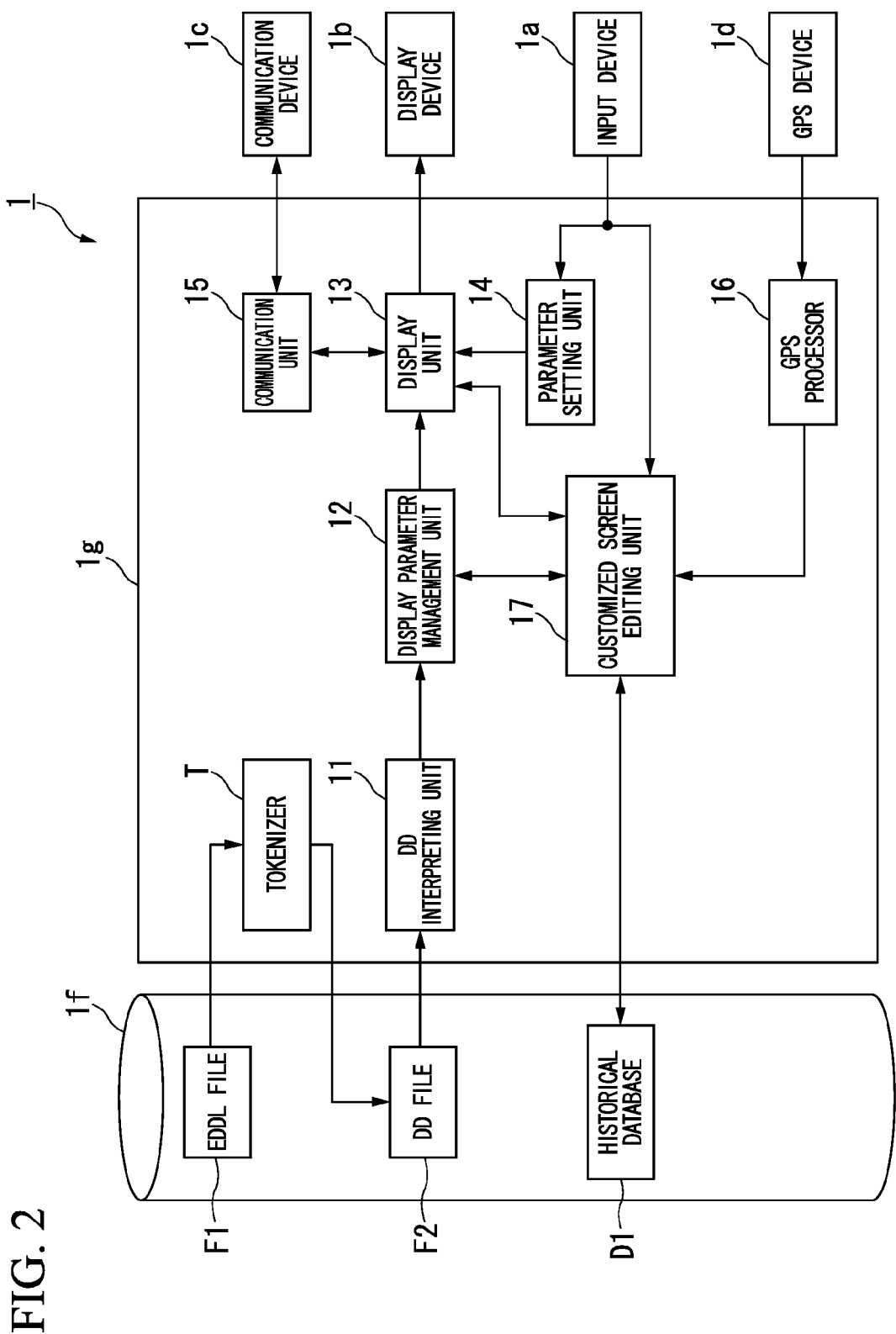
FIG. 2 is a block diagram showing the main parts of the constitution of the device information display apparatus in accordance with the first preferred embodiment of the present invention.

FIG. 2 is a block diagram showing the main parts of the constitution of the device information display apparatus in accordance with the first preferred embodiment of the present invention. As shown in FIG. 2, the device information display apparatus 1 of the first preferred embodiment includes, in addition to an input device 1a, a display device 1b, a communication device 1c, a GPS device 1d, and the drive device 1e shown in FIG. 1, a storage device 1f and a processor 1g. The storage device 1f is an external device such as a hard-disk device, which stores, in addition to the program that is read and installed from the recording medium M by the above-described drive device 1e, an EDDL file F1, a DD file F2, and a historical database D1, and the like. The historical database D1 constitutes a storage unit.

The above-noted EDDL file F1 is a file into which various parameters indicating the characteristics and attributes of the field devices 2 are coded, using the EDDL language. The EDDL file F1 is a file in text format, which can hierarchically define parameters, in accordance with the characteristics and attributes of the field devices 2, and which is provided by the vendor, for example, of a field device 2. The DD file F2 is a file that is converted into binary format from the EDDL file F1 so as to enable handling by the device information display apparatus 1.

The historical database D1 is a database into which is stored the history of maintenance work performed with respect to the field devices 2 by a user, using the device information display apparatus 1. Specifically, it stores information (first position information) indicating the position of the acquisition of parameters from a field device 2 when maintenance work of the field device 2 is done, information indicating the field device from which, and the time at which, the parameters had been acquired, information (reproduction information) for the purpose of reproducing the displayed content (customized screen) of the display device 1b that has been modified in accordance with a user instruction, information indicating the time of modification of the displayed content, and information indicating the number of times of accessing the displayed content (page) of the display device 1b.

In this case, the maintenance work is basically performed in a condition in which the user operating the device information display apparatus 1 approaches the field device 2 to be maintained (a condition in which the distance to the field device 2 is no more than several meters). For this reason, at the time of this maintenance work, information indicating the position at which the parameters are acquired from the field device 2 can be used as information indicating the position of the field device 2.

The processor 1g is, for example, a CPU (central processing unit), which performs overall control of the operation of the device information display apparatus 1. This processor 1g, by executing a readout of a program stored in the storage device 1f, implements a tokenizer T, a DD interpreting unit 11, a display parameter management unit 12, a display unit 13, a parameter setting unit 14, a communication unit 15, a GPS processor 16, and a customized screen editing unit 17, shown in FIG. 2. The display parameter management unit 12, the display unit 13, and the customized screen editing unit 17 constitute a display control unit. The GPS processor 16 is included in the position information acquisition unit.

The tokenizer T is launched by a user instruction, and generates a DD file F2 from the EDDL file F1. The tokenizer T has what could be called the function of a compiler. Once the DD file F2 is generated by the tokenizer T from the EDDL file F1, as long as the contents of the EDDL file F1 are not modified or a new EDDL file F1 is not added, there is no need to launch the tokenizer T.

By reading and interpreting the DD file F2 stored in the storage device 1f, the DD interpreting unit 11 accesses the parameters of the field devices 2. The DD interpreting unit 11 is provided in the form of a library by, for example, the Fieldbus Foundation. The display parameter management unit 12 manages the parameters that are displayed on the display device 1b. Specifically, in accordance with the definition of the EDDL file F1 (DD file F2), the display parameter management unit 12 manages the structure of the menu of parameters to be displayed on the display device 1b and the list of parameters displayed on the display device 1b.

The display unit 13, based on the information managed by the display parameter management unit 12, graphically displays on the display device 1b a menu tree that hierarchically indicates a menu of parameters and a list of parameters that are selected in the menu tree. The parameter setting unit 14, in response to operation signals output from the input device 1a, changes the values of parameters displayed on the display device 1b by the display unit 13. The communication unit 15, by controlling the communication device 1c and communicating with the field device 2, acquires various parameters from the field devices 2, or makes parameter settings with respect to the field devices 2.

The GPS processor 16 processes the received signal output from the GPS device 1d, calculates the position of the device information display apparatus 1, and outputs information indicating the calculated position to the customized screen editing unit 17. The customized screen editing unit 17, in response to operation signals output from the input device 1a, edits the parameter display screen displayed on the display device 1b and manages the historical data base D1.

The customized screen editing unit 17, by changing parameters that are managed by the display parameter management unit 12 in response to operation signals output from the input device 1a, changes the parameter display screen that is to be displayed on the display device 1b. Specifically, in response to operation signals from the input device 1a, cutting, copying, and pasting and the like is done of parameters graphically displayed on the display device 1b (not only the parameter values, but also the names of the parameters). By providing the customized screen editing unit 17, a user can graphically edit (customize) the parameter display screen.

When the parameter display screen is edited, the customized screen editing unit 17 stores information (reproduction information) for the purpose of reproducing the edited parameter display screen (customized screen) on the display device 1b into the historical database D1. When this is done, the customized screen editing unit 17 associates and stores into the historical database D1 the above-noted information and information indicating the position at which the parameters that had been displayed on the pre-editing parameter display screen had been acquired (first position information), information identifying the field device 2 that had acquired the parameter and information indicating the time at which the parameters had been acquired.

When prescribed conditions are satisfied, the customized screen editing unit 17 uses the information stored in the historical database D1 to reproduce a customized screen on the display device 1b. Specifically, the distance between the position indicated by the current position information output from the GPS processor 16 (second position information) and the position indicated by position information stored in the historical database D1 is calculated, and if this distance is no greater than a pre-established reference distance (for example, approximately several meters), the customized screen is reproduced on the display device 1b. Also, the customized screen editing unit 17 counts the number of times that each page displayed on the display device 1b is accessed, and stores information indicating the counted number of access times in the historical database D1.

Next, the operation of the device information display apparatus 1 having the above-noted constitution will be described. In this case, the operation of the device information display apparatus 1 is roughly divided into operation when there is no data accumulated in the historical database D1, and operation when there is data accumulated therein, and will be described below in that sequence. To simplify the following descriptions, the assumption is made that a DD file F2 has already be created from the EDDL file F1, using the tokenizer T.

Operation when No Data is Accumulated in the Historical Database D1

First, the user applies power to the device information display apparatus 1 and launches the installed program to implement the functions of the DD interpreting unit 11 to the customized screen editing unit 17 shown in FIG. 2. When the launching of the program in the device information display apparatus 1 is completed, the user connects the device information display apparatus 1 to the network N.

When the above-noted tasks are completed, the communication device 1c is controlled by the communication unit 15 so as to communicate with the field devices 2 via the network N, thereby displaying information indicating the field devices 2 that are connected to the network N as a list on the display device 1b of the device information display apparatus 1. With this list display shown, the user operates the input device 1a to select one from the information indicating field devices 2 in the list display, at which point communication is done with the selected field device 2 so that the communication unit 15 acquires parameters. Also, the DD file F2 stored in the storage device 1f is interpreted by the DD interpreting unit 11. By doing this, the parameters of the field device 2 can be accessed.

When the interpreting by the DD interpreting unit 11 is completed, management of the menu structure of the parameters displayed on the display device 1b and the list of parameters displayed by the display parameter management unit 12 on the display device 1b begins. Then, based on the information managed by the display parameter management unit 12, the display unit 13 graphically displays on the display device 1b the functional blocks of the field device 2 in a menu format within one window.

When the above-noted display is made, the customized screen editing unit 17 performs recording into the historical database D1. Specifically, the customized screen editing unit 17 associates and stores into the historical database D1 information indicating the position at which the parameters of the field device 2 had been acquired (current position information output from the GPS processor 16), information indicating the field device 2 selected by the user, and information indicating the time at which the parameters had been acquired from the field device 2 (first and second steps).

When the registration into the historical database D1 is completed, and the user operates the input device 1a to perform an operation of selecting a functional block displayed in the window, a list of selected parameters and the values thereof are displayed in the window. The list of parameters and their values are displayed in the one page or for each of a plurality of pages provided in the window. In this case, when the user operates the input device 1a and opens a page that includes a parameter that the user wishes to access, the customized screen editing unit 17 increments the number of access times of the open page, and stores the number of access times and the time at which the access had been made into the historical database D1.

When the user uses the input device 1a to perform an operation of changing the value of a parameter displayed in the window, the change of the value of the parameter in accordance with the user operation is performed by the parameter setting unit 14. After changing the parameter value, when the user operates the input device 1a to make a parameter setting instruction, the communication device 1c is controlled by the communication unit 15 to start communication with the field device 2, and the parameter with the changed value is set into the field device 2.

When the user uses the input device 1a to make an edit instruction for a parameter displayed in the window, the content displayed in the window goes into the editable condition. After this condition is entered, if for example the user uses the input device 1a to perform an operation to make an instruction to remove a parameter displayed in the display device 1b, the customized screen editing unit 17 edits the content of the window and the number of parameters is reduced. After completing the above-noted operation, when the user instructs to save the content of the window after the editing, the customized screen editing unit 17 stores into the historical database D1 the information required for the reproduction of the edited window content (customized window), associating it with the previously stored condition (information indicating the position and time of acquiring the parameters from the field device 2 and the like).

Operation when Data is Accumulated in the Historical Database D1

First, similar to the case in which there is no data accumulated in the historical database D1, the user applies power to the device information display apparatus 1, and launches the installed program to implement the functions of the DD interpreting unit 11 to the customized screen editing unit 17 shown in FIG. 2. When the launching of the program in the device information display apparatus 1 is completed, the initial window W0 shown in FIG. 3A is displayed on the display device 1b.

Figure 3A:
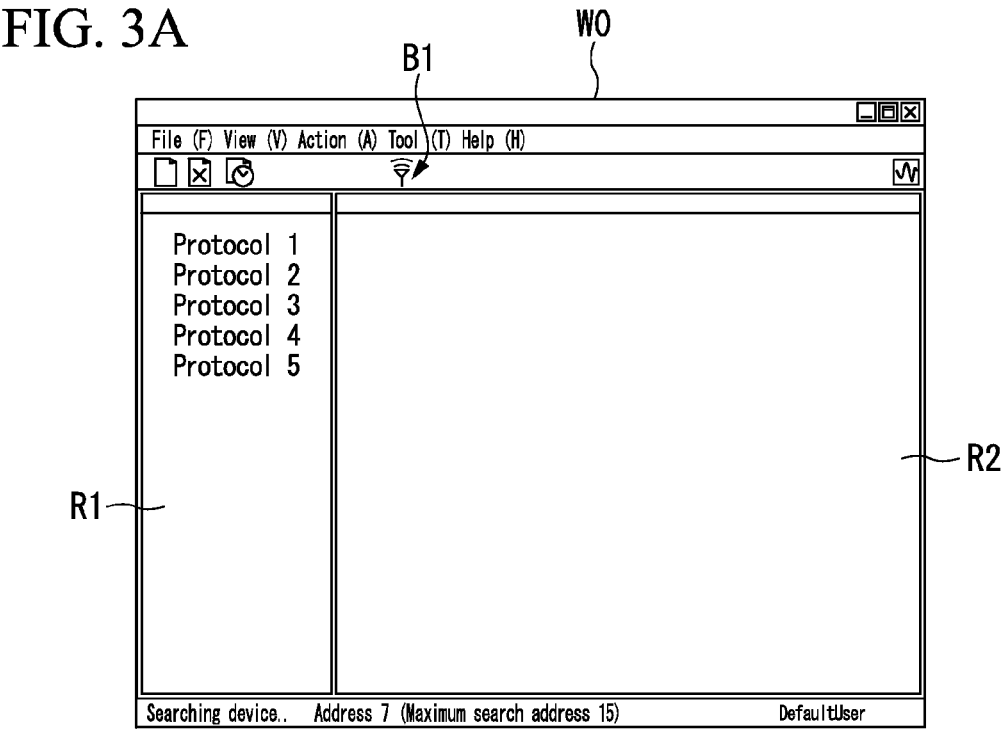
FIGS. 3A and 3B are drawings showing the initial window that is displayed on the device information display apparatus in accordance with the first preferred embodiment of the present invention.
Figure 3B:
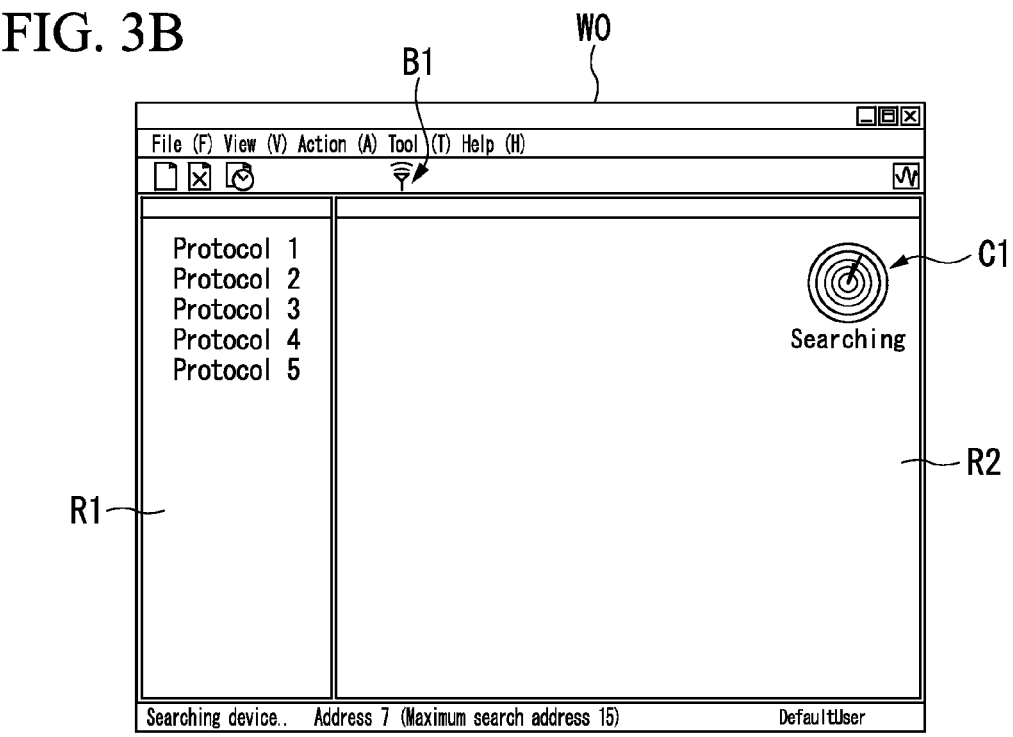

FIGS. 3A and 3B are drawings showing the initial window that is displayed on the device information display apparatus in accordance with the first preferred embodiment of the present invention. As shown in FIG. 3A, the initial window W0 is provided with a protocol display region R1 and a working region R2, and also a GPS button B1. The protocol display region R1 is a region in which a list of the protocols usable by the device information display apparatus 1 is displayed. The protocols displayed in the protocol display region R1 include, for example, a protocol that conforms to the ISA100.11a wireless communication standard.

The working region R2 displays various icons for controlling the device information display apparatus 1 and the like, and a list of information indicating the field devices 2 connected to the network N. The GPS button B1 is a button for switching between setting or not setting the operating mode of the device information display apparatus 1 to the GPS mode. In this case, the term GPS mode refers to the mode in which current position information acquired from the GPS processor 16 is used to automatically search for nearby field devices 2.

After the initial window W0 is displayed, when the user operates the input device 1a and presses the GPS button B1 provided in the initial window W0, the device information display apparatus 1 transitions to the GPS mode and, as shown in FIG. 3B, an icon C1 is displayed in the working region R2 of the initial window W0. The icon C1 is an icon indicating that the operating mode of the device information display apparatus 1 is the GPS mode.

After the operating mode of the device information display apparatus 1 transitions to the GPS mode, when the user connects the device information display apparatus 1 to the network N, the communication unit 15 controls the communication device 1c, and communicates with the field device 2 via the network N, thereby acquiring into the device information display apparatus 1 information indicating the field devices 2 that are connected to the network N.

When this is done, the customized screen editing unit 17 acquires current position information of the GPS processor 16 (third step), position information stored in the historical database D1 is read out into the customized screen editing unit 17, and field devices 2 positioned nearby to the device information display apparatus 1 are automatically searched. Specifically, the distance between the position indicated by the current position information from the GPS processor 16 and position indicated by position information from the historical database D1 is calculated, and distances that are no greater than a reference distance are selected, so that information identifying the field device information corresponding to the position information for which the selected distances have been acquired is read out from the historical database D1, thereby automatically searching for field devices 2 that are in the vicinity of the device information display apparatus 1.

When the automatic search for the field devices 2 has been performed, the customized screen editing unit 17 extracts the automatically searched field devices 2 from the information acquired by communication via the network N. Then, information indicating the field devices 2 extracted by the customized screen editing unit 17 is displayed as a list in the working region R2 of the initial window W0.

Figure 4A:
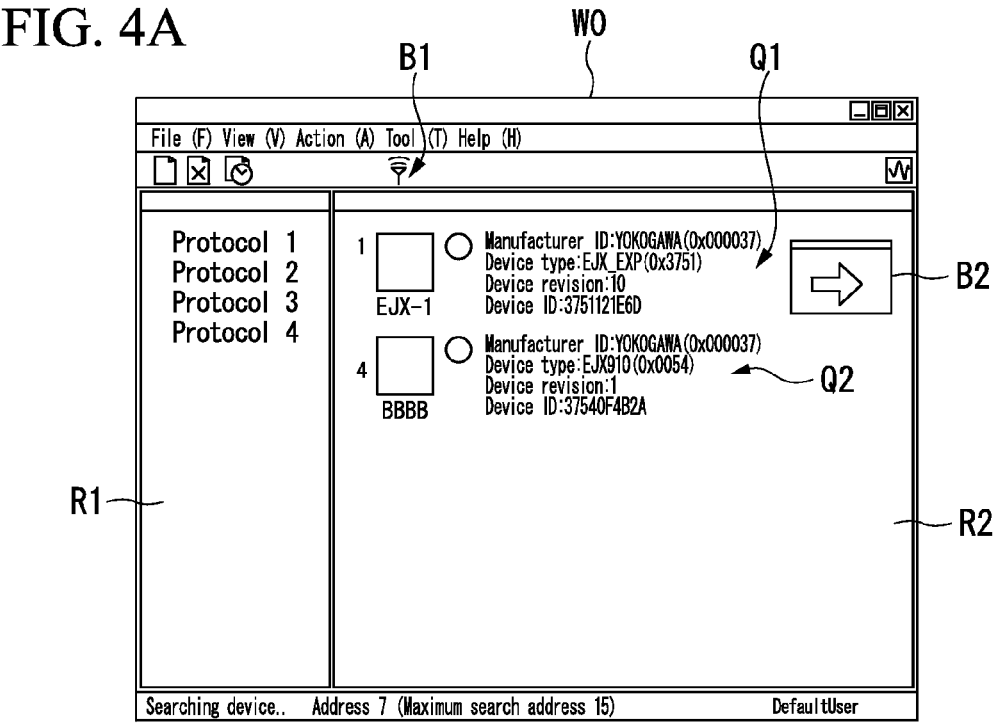
FIGS. 4A and 4B are drawings showing display examples in the device information display apparatus in accordance with the first preferred embodiment of the present invention.
Figure 4B:
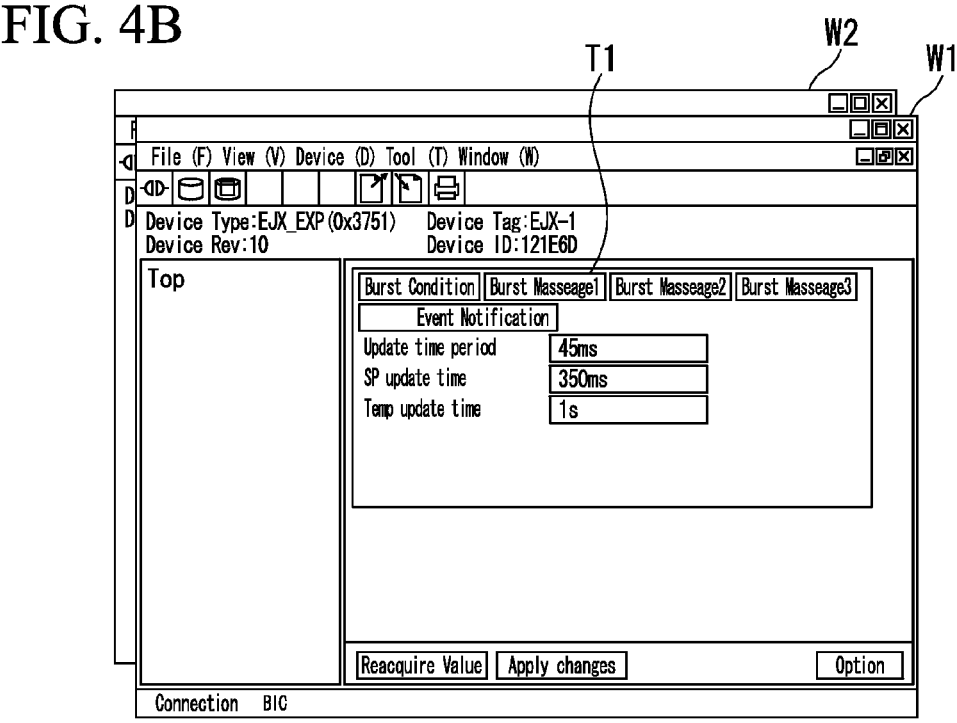

FIGS. 4A and 4B are drawings showing display examples in the device information display apparatus in accordance with the first preferred embodiment of the present invention. In the example shown in FIG. 4A, the two information Q1 and Q2 indicating field devices 2 are displayed in a list in the working region R2 of the initial window W0. These information Q1 and Q2 are information constituted by an icon indicating the outer appearance of the field device in schematic form and character information (for example, information indicating the manufacturing ID, the device type, the device revision, and the device ID) indicating the general description of the field device.

In addition to the above-noted information indicating the field devices 2, a customized screen display button B2 is displayed in the working region R2 of the initial window W0. The customized screen display button B2 is a button for causing display of a customized screen regarding the field devices 2 in the list display in the working region R2 for each of the field devices 2.

When the user operates the input device 1a and presses the customized screen display button B2 displayed in the working region R2 of the initial window W0, information for reproducing the customized screens regarding the field devices 2 identified by the information Q1 and Q2 (reproduction information) is read out to the customized screen editing unit 17 from the historical database D1, so as to display the two windows W1 and W2 shown in FIG. 4B.

The window W1 is a customized window regarding the field device 2 identified by the information Q1 displayed in the working region R2 of the initial window W0 shown FIG. 4A, and the window W2 is a customized window regarding the field device 2 identified by the information Q2 displayed in the working region R2. In this manner, the customized screens of each of the field devices 2 identified by the information Q1 and Q2 are reproduced separately (fourth step).

In this case, if the user operates the input device 1a to select, for example, a table T1 displayed in the window W1 and cause display of a new page, the customized screen editing unit 17 increments the number of access times for the newly displayed page and stores the number of access times and the time at which the access had been made into the historical database D1. In the case of reproducing a customized screen, only screens that have been accessed at least an established number of times may be reproduced.

As described above, in the first preferred embodiment, if information indicating a position (nearby the installation position of a field device 2) at which a parameter is acquired from a field device 2 and information for reproducing a customized screen are associated with one another and stored into the historical database D1 and the position indicated by the currently acquired information is near the installation position of a field device 2, information stored in the historical database D1 is used to reproduce the customized screen. By doing this, because the customized screen is automatically displayed regarding the field device 2 installed at a position close to the current position, it is possible to dramatically improve the user's work efficiency.

Second Preferred Embodiment

Figure 5:
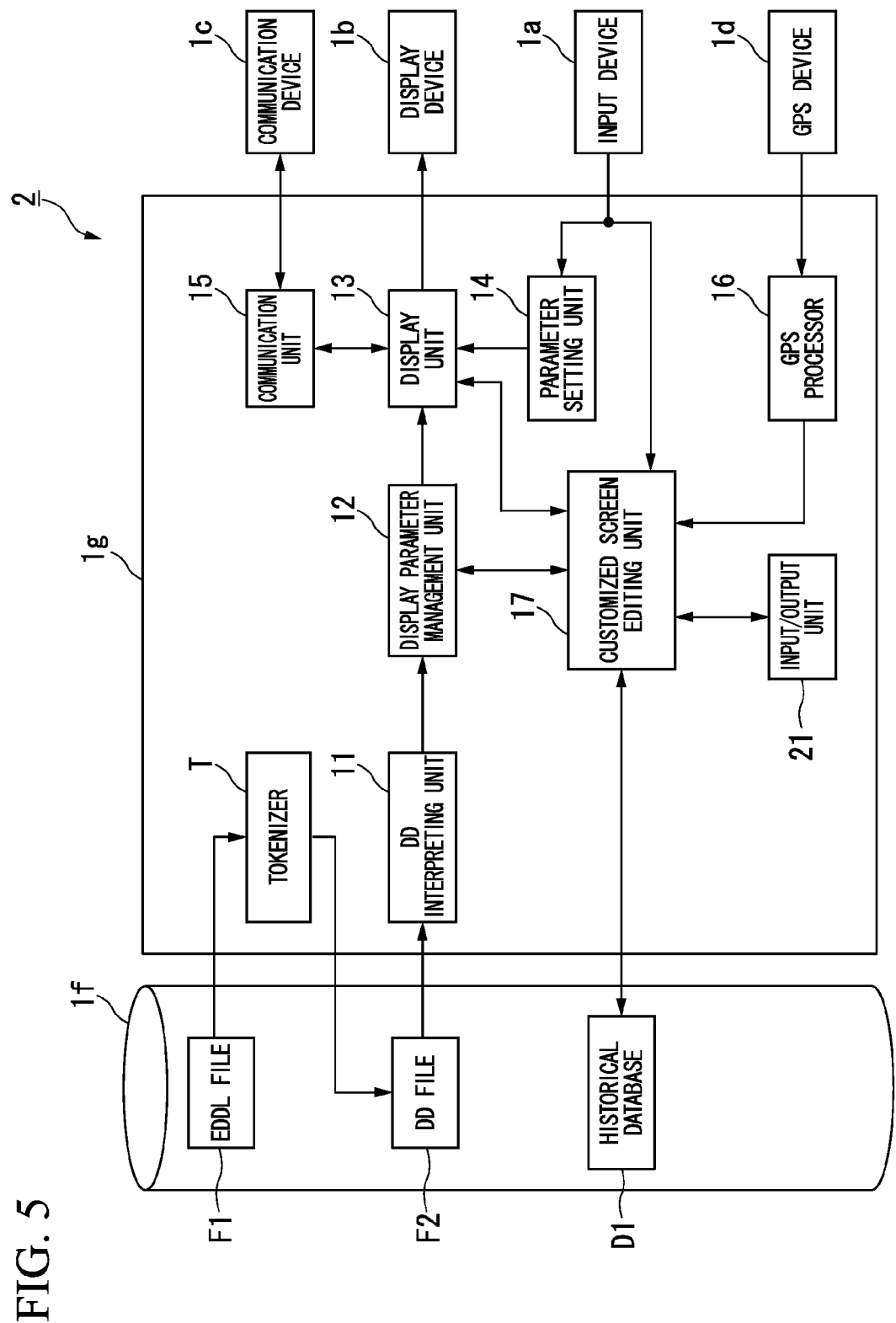
FIG. 5 is a block diagram showing the main parts of the constitution of a device information display apparatus in accordance with a second preferred embodiment of the present invention.

FIG. 5 is a block diagram showing the main parts of the constitution of a device information display apparatus in accordance with the second preferred embodiment of the present invention. The device information display apparatus 2 shown in FIG. 5 has a constitution in which an input/output unit 21 is added to the processor 1g of the device information display apparatus 1 shown in FIG. 2. The input/output unit 21, in addition to being able to output to the outside (export) information stored in the historical database D1 (for example, information for reproducing a customized screen), is capable of inputting from the outside (importing) information that is to be stored in the historical database D1 (for example, information for reproducing a customized screen).

Figure 6:
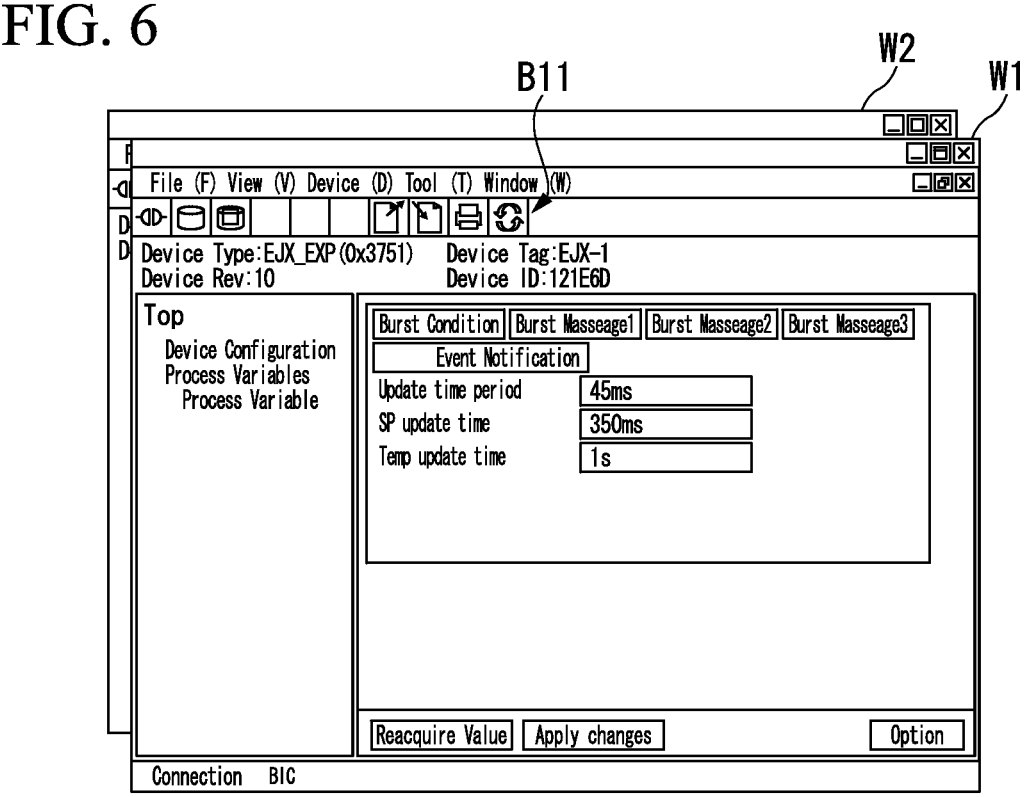
FIG. 6 is a drawing showing an example of a display in the device information display apparatus in accordance with the second preferred embodiment of the present invention.

FIG. 6 is a drawing showing an example of a display in the device information display apparatus in accordance with the second preferred embodiment of the present invention. As shown in FIG. 6, in the second preferred embodiment, an input/output button B11 is provided in the windows W1 and W2 in which the customized screens shown in FIG. 4B are reproduced. By pressing this input/output button B11, it is possible to input and output information via the input/output unit 21. Alternatively, only output or only input may be enabled.

As described above, in the second preferred embodiment, because the input/output unit 21 that can input information to be stored in the historical database D1 is provided, by reading in a historical database created on another computer, it is possible to reproduce the display screen content of that computer on the display device 1b of the device information display apparatus 2. Also, because the input/output unit 21 that can output information that is stored in the historical database D1 is provided, by outputting the historical database D1, it is possible to reproduce the content displayed on the display device 1b of the device information display apparatus 2 on another computer.

Third Preferred Embodiment

Figure 7:
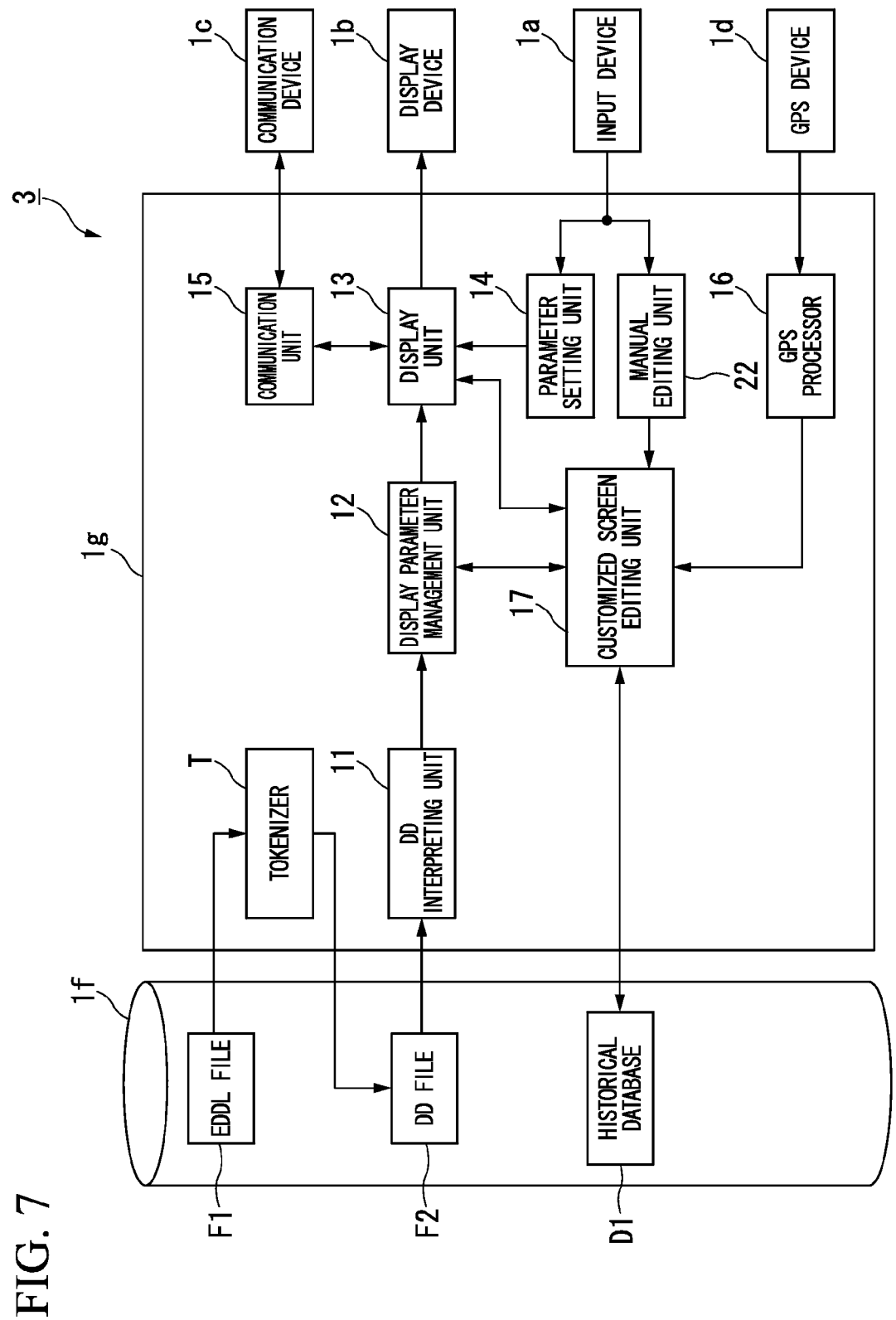
FIG. 7 is a block diagram showing the main parts of the constitution of a device information display apparatus in accordance with a third preferred embodiment of the present invention.

FIG. 7 is a block diagram showing the main parts of the constitution of a device information display apparatus in accordance with the third preferred embodiment of the present invention. The device information display apparatus 3 shown in FIG. 7 has a constitution in which a manual editing unit 22 is added to the processor 1g of the device information display apparatus 1 shown in FIG. 2. The manual editing unit 22, in response to an operation of the input device 1a by the user, sets the display or non-display for individual parameters displayed on the customized screen.

Figure 8A:
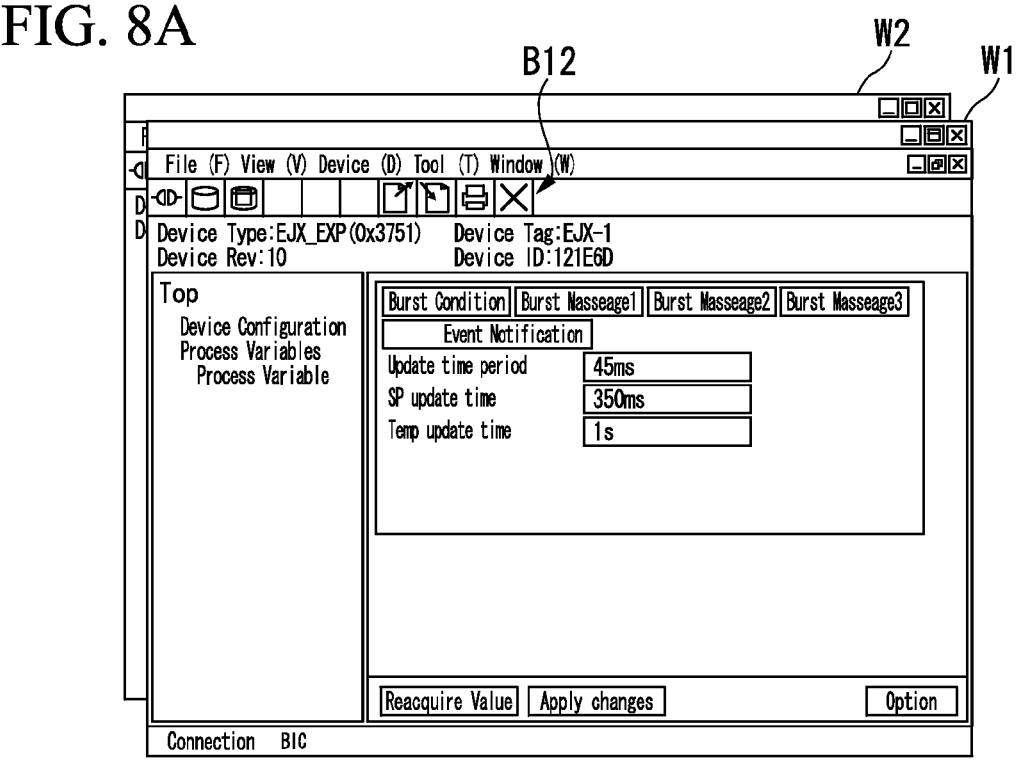
FIGS. 8A and 8B are drawings showing an example of a display in the device information display apparatus in accordance with the third preferred embodiment of the present invention.
Figure 8B:
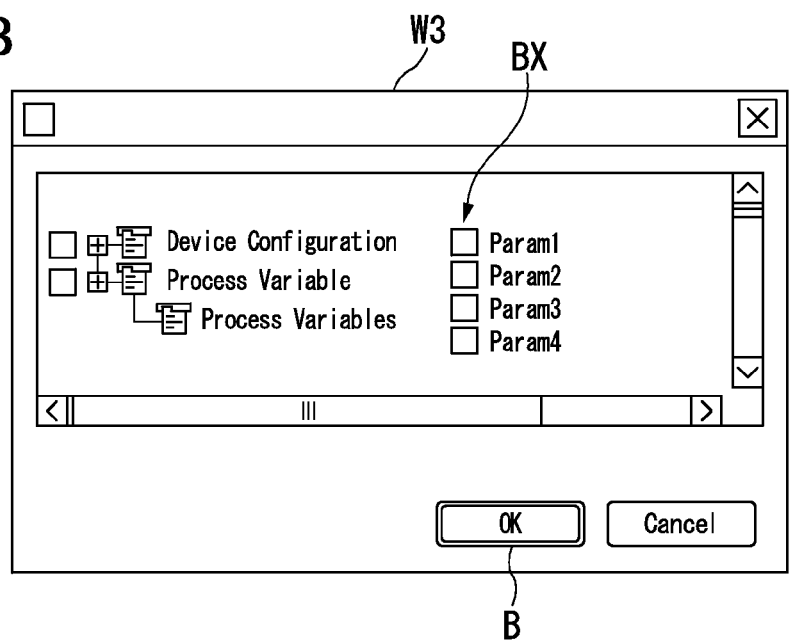

FIGS. 8A and 8B are drawings showing an example of a display in the device information display apparatus in accordance with the third preferred embodiment of the present invention. As shown in FIG. 8A, in the third preferred embodiment, a manual customize button B12 is provided in the windows W1 and W2 in which the customized screens shown in FIG. 4B are reproduced. By pressing this manual customize button B12, a pop-up window W3 as shown in FIG. 8B is displayed, and it is possible to set display or non-display for individual parameters.

Specifically, by inputting a check into a checkbox BX corresponding to a parameter name displayed in the pop-up window W3 and pressing the OK button B, an instruction to the effect that the checked parameter is not to be displayed is output from the manual editing unit 22 to the customized screen editing unit 17, so as to cause non-display. By removing the check from the checkbox BX of a non-displayed parameter in the pop-up window W3 and pressing the OK button B, display is once again made.

As described above, in the third preferred embodiment, because the manual editing unit 22 that enables setting of display and non-display for individual parameters displayed in the customized screen is provided, it is possible to change a part of a customized screen, without editing the customized screen. For this reason, it is, for example, possible to set as non-display only parameters that no longer need to be accessed, thereby enabling an easy to view customized screen.

Fourth Preferred Embodiment

Figure 9:
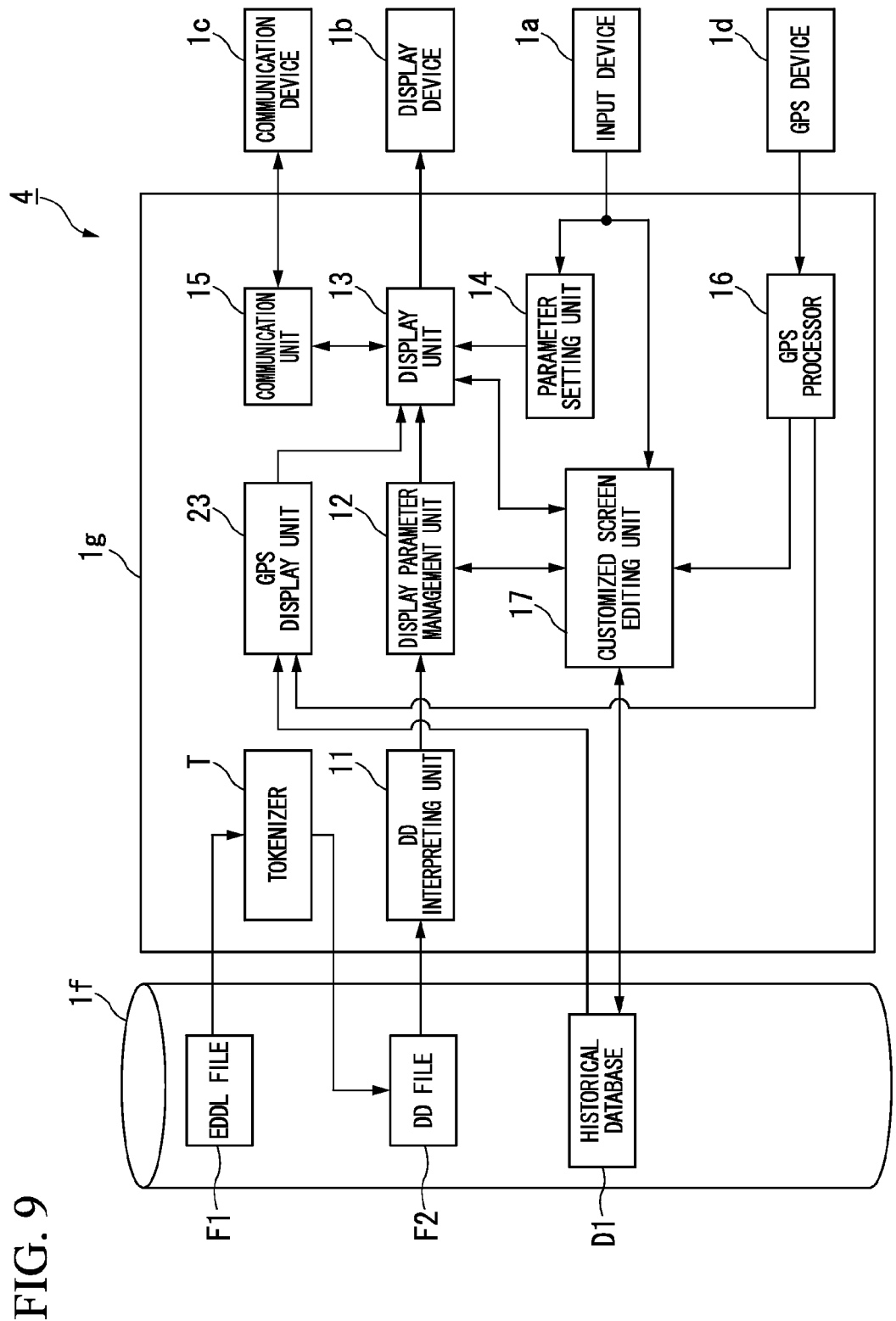
FIG. 9 is a block diagram showing the main parts of the constitution of a device information display apparatus in accordance with a fourth preferred embodiment of the present invention.

FIG. 9 is a block diagram showing the main parts of the constitution of a device information display apparatus in accordance with the fourth preferred embodiment of the present invention. The device information display apparatus 4 shown in FIG. 9 has a constitution in which a GPS display unit 23 is added to processor 1g of the device information display apparatus 1 shown in FIG. 2. The GPS display unit 23 is included in the display control unit. In addition to acquiring information indicating the position (near the position of installation of a field device 2) at which parameters are acquired from the field device 2 by accessing the historical database D1, the GPS display unit 23 acquires the current position information from the GPS processor 16 and causes display of a two-dimensional map indicating the relationship therebetween on the display device 1b.

Figure 10A:
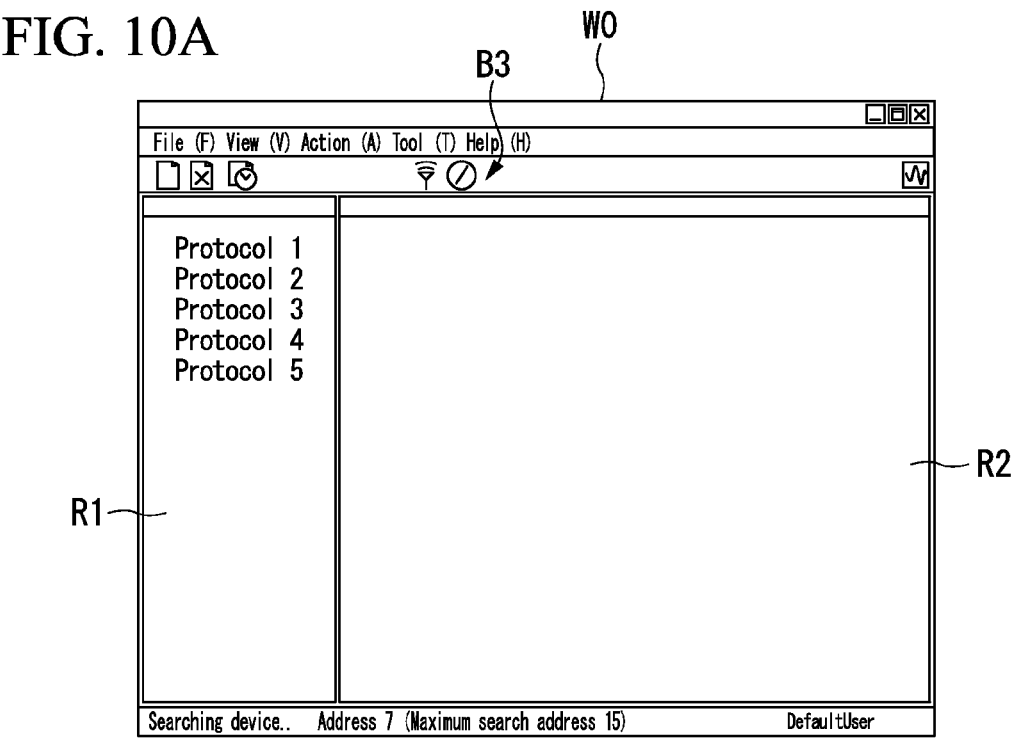
FIGS. 10A and 10B are drawings showing an example of a display in the device information display apparatus in accordance with the fourth preferred embodiment of the present invention.
Figure 10B:
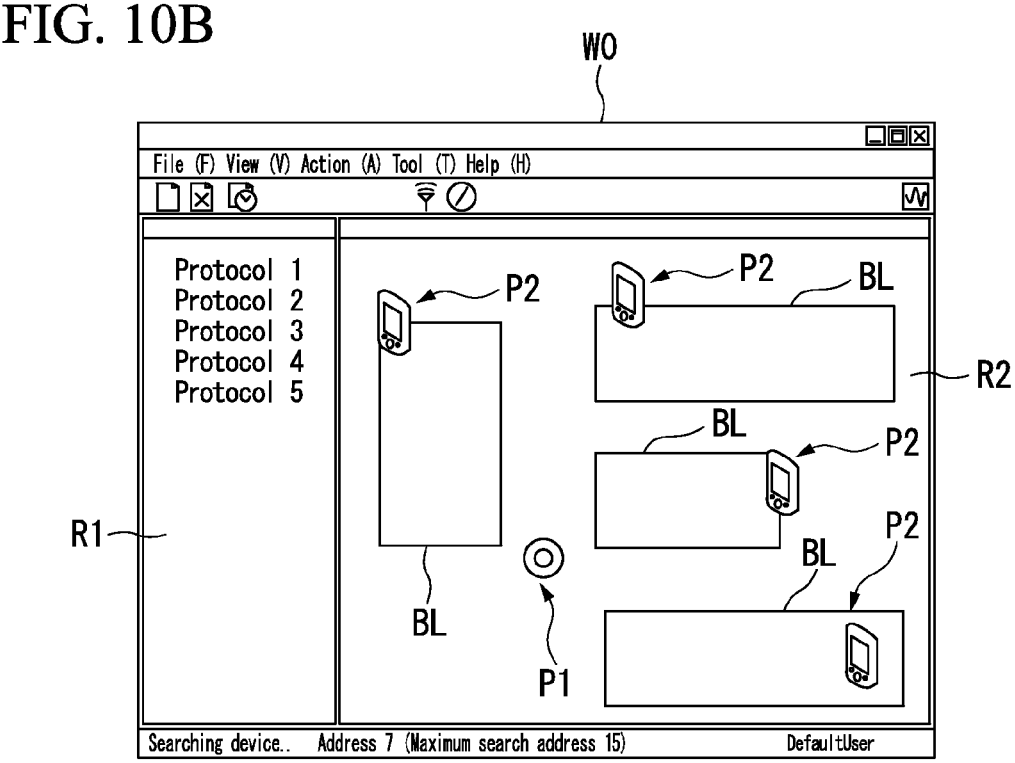

FIGS. 10A and 10B are drawings showing an example of a display in the device information display apparatus in accordance with the fourth preferred embodiment of the present invention. As shown in FIG. 10A, an inspection position display button B3 is provided in the initial window W0. The inspection position display button B3 is a button for the purpose of causing display of the above-noted two-dimensional map in the working region R2 of the initial window W0.

When the inspection position display button B3 is pressed, information stored in the historical database D1 (information indicating the position of acquisition of parameters from the field device 2) is read out to the GPS display unit 23 and the current position information is acquired by the display unit 23 from the GPS processor 16. Then, as shown in FIG. 10B, a two-dimensional map showing the positional relationship between the icon P1 indicating the current position and the icons P2 indicating the positions at which the inspections were performed in the past is displayed in the working region R2 of the initial window W0. By using map information of a plant or the like, it is possible to display the outer shape (plan view outer shape) of the buildings BL along with the icons P1 and P2.

As described above, in the fourth preferred embodiment, because the GPS display unit 23 that causes display of a two-dimensional map showing the positional relationship between the icon P1 indicating the current position and the icons P2 indicating the positions at which inspections were performed in the past is provided, it is possible to make a bird's-eye verification of the locations at which inspections were performed in the past. By doing this, it is possible for even a user (worker) with not much on-site experience to easily perform the verification of the locations.

The above-noted preferred embodiments have been described for the example in which, by interpreting a DD file F2 that is created from an EDDL file F1 using the tokenizer T, so as to access parameters of the field devices 2. However, the user may access parameters of the field devices 2 by providing an interpreting unit that directly interprets the EDDL file F1, without using the tokenizer T and the DD file F2. Additionally, a general-purpose type of file format enabling definition of a hierarchical structure, such as an XML (Extensible Markup Language) file or the like may be used in place of the EDDL file F1.

Also, the above-noted preferred embodiments have been described for the example in which the functionality of the device information display apparatus 1 is implemented in a software manner, by reading out and installing a program recorded on a recording medium M using the drive 1e. However, the functionality of the device information display apparatus 1 may be implemented by installing in a computer a program (program that is similar to the program recorded on the recording medium M) downloaded via a network such as the Internet. The functionality of the device information display apparatus 1 may also be implemented by hardware.

The present invention provides a device information display apparatus and method that, by automatically displaying device information that it is expected that the user will require, enable an improvement in the efficiency of the work of the user.

According to the preferred embodiment of the present invention, the distance between a position indicated by first position information stored in a storage unit and a position indicated by second position information acquired by a position information acquisition unit is calculated and, if this distance is no greater than a reference distance, the reproduced information corresponding to the first position information is used to reproduce the display contents of the display device on the display device, thereby enabling automatic display of device information that it is expected a user requires, so as to improve the work efficiency of the user.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A device information display apparatus comprising:
a communication unit configured to communicate with a field device;
a display device configured to display parameters of the field device and values of the parameters acquired by communicating with the field device via the communication unit;
a storage unit;

a display control unit configured to associate first position information, which indicates a position of the device information display apparatus at which the values of the parameters displayed on the display device are acquired, and reproduction information, which is for reproducing the parameters that have been modified based on a first operation instruction for the parameters displayed on the display device, and to store the first position information and the reproduction information into the storage unit;

a position information acquisition unit configured to acquire second position information that indicates a current position of the device information display apparatus and provide the second position information to the display control unit; and a setting unit configured to change the values of the parameters set to the field device based on a second operation instruction for the values of the parameters, wherein the display control unit is configured to:

calculate a distance between positions indicated by the first position information stored in the storage unit and the second position information, identify at least one field device associated with the first position information in which the distance between the positions indicted by the first position information and the second position information is no greater than a prescribed reference distance, read out the reproduction information associated with the identified at least one field device from the storage unit, to reproduce the parameters on the display device using the reproductions information associated with the identified at least one field device, and display the parameters, which have been modified based on the first operation instruction for the parameters, on the display device, to associate the second position information acquired by the position information acquisition unit with the reproduction information for reproducing the modified parameters, and to store the second position information as the first position information and the reproduction information for reproducing the modified parameters into the storage unit, wherein the display control unit is configured to be capable of displaying a two-dimensional map showing a relationship between the position indicated by the first position information stored in the storage unit and the position indicated by the second position information acquired in the position information acquisition unit.

2. The device information display apparatus according to claim 1, wherein the display control unit is configured to reproduce the parameters by using the reproduction information in units of windows.

3. The device information display apparatus according to claim 1, further comprising: an input/output unit configured to be capable of outputting to outside the reproduction information stored in the storage unit, and receiving from the outside the reproduction information that is to be stored in the storage unit.

4. The device information display apparatus according to claim 1, wherein the position information acquisition unit is configured to measure the position of the device information display apparatus by receiving a radio signal from a satellite using the Global Positioning System.

5. The device information display apparatus according to claim 1, wherein the storage unit stores the first position information, which indicates the position of acquisition of the values of the parameters from the field device when maintenance work of the field device is done, information indicating the field device from which, and the time at which, the values of the parameters had been acquired, the reproduction information, which is for reproducing the parameters that have been modified based on a user instruction, information indicating a time of modification of the parameters, and information indicating the number of times of accessing display content of the display device.

6. The device information display apparatus according to claim 1, wherein the display control unit is configured to edit device information display screen displayed on the display device and to manage the storage unit in response to the first operation instruction output from an input device.

7. The device information display apparatus according to claim 1, wherein the display control unit is configured to change device information display screen that is to be displayed on the display device by changing the parameters that are managed by the display control unit based on the first operation instruction output from an input device.

8. The device information display apparatus according to claim 1, wherein the display control unit is configured to count the number of times that each page displayed on the display device is accessed and to store information indicating the counted number of access times in the storage unit, and the display control unit is configured to read out the reproduction information associated with the page, which have been accessed at least an established number of times, from the storage unit, and to reproduce the parameters on the display device using the reproduction information.

9. The device information display apparatus according to claim 1, further comprising: a manual editing unit configured to set display or non-display for individual parameters displayed on the display device based on an operation of an input device by a user.

10. A device information display method for displaying parameters of a field device and values of the parameters acquired by communicating with the field device on a display device, the device information display method comprising:

acquiring first position information that indicates a position of a device information display apparatus at which the values of the parameters displayed on the display device are acquired;

storing reproduction information, which is for reproducing the parameters that has been modified based on an operation instruction for the parameters displayed on the display device, associating the reproduction information with the first position information;

acquiring second position information that indicates a current position of the device information display apparatus;

calculating a distance between positions indicated by the first position information stored and the second position information, identifying at least one field device associated with the first position information wherein the distance between the positions indicated by the first position information and the second position information is no greater than a prescribed reference distance, reading out the reproduction information associated with the identified at least one field device reproducing the parameters on the display device using the reproduction information associated with the identified at least one field device, displaying the parameters, which have been modified based on the operation instruction for the parameters, on the display device, associating the second position information with the reproduction information for reproducing the modified parameters, and storing the second position information as the first position information and the reproduction information for reproducing the modified parameters, and displaying a two-dimensional map showing a relationship between the position indicated by the first position information stored in the storage unit and the position indicated by the second position information acquired in the position information acquisition unit.

11. The device information display method according to claim 10, further comprising: reproducing the parameters by using the reproduction information in units of windows.

12. The device information display method according to claim 10, further comprising:
   outputting to outside the reproduction information that has been stored; and
   receiving from the outside the reproduction information that is to be stored.

13. The device information display method according to claim 10, further comprising: measuring the current position by receiving a radio signal from a satellite using the Global Positioning System.

14. The device information display method according to claim 10, further comprising: storing the first position information, which indicates the position of acquisition of the values of the parameters from the field device when maintenance work of the field device is done, information indicating the field device from which, and the time at which, the values of the parameters had been acquired, the reproduction information, which is for reproducing the parameters that have been modified based on a user instruction, information indicating a time of modification of the parameters, and information indicating the number of times of accessing display content of the display device.

15. The device information display method according to claim 10, further comprising:
   counting the number of times that each page displayed on the display device is accessed; and
   storing information indicating the counted number of access times, and
   wherein reproducing the parameters on the display device comprises reading out the reproduction information associated with the page, which have been accessed at least an established number of times, and reproducing the parameters on the display device using the reproduction information.

16. The device information display method according to claim 10, further comprising: setting display or non-display for individual parameters displayed on the display device based on an operation of an input device by a user.

* * * * *